United States Patent [19]

Aizawa

[11] Patent Number: 5,497,362
[45] Date of Patent: Mar. 5, 1996

[54] DRIVE INTERFACE FOR PERFORMING WRITE/READ OF INFORMATION

[75] Inventor: Takayuki Aizawa, Yokohama, Japan

[73] Assignee: Canon Kabushiki Kaisha, Tokyo, Japan

[21] Appl. No.: 341,044

[22] Filed: Nov. 15, 1994

Related U.S. Application Data

[63] Continuation of Ser. No. 9,396, Jan. 27, 1993, abandoned, which is a continuation of Ser. No. 375,474, Jul. 5, 1989, abandoned.

[30] Foreign Application Priority Data

Jul. 4, 1988 [JP] Japan .................... 63-166540

[51] Int. Cl.[6] .................................... G11B 7/00
[52] U.S. Cl. ............................ 369/53; 369/48
[58] Field of Search ................... 369/53, 54, 44.27, 369/131, 48, 49, 32, 59, 58; 364/200, 900; 307/475; 360/77.08, 69

[56] References Cited

U.S. PATENT DOCUMENTS

| | | | |
|---|---|---|---|
| 3,833,892 | 9/1974 | Marsalka | 364/900 X |
| 4,349,870 | 9/1982 | Shaw | 364/200 X |
| 4,530,048 | 7/1985 | Proper | 364/200 X |
| 4,689,022 | 8/1987 | Peers et al. | 360/69 |
| 4,789,975 | 12/1988 | Taniyama | 369/59 |
| 4,796,250 | 1/1989 | Kobayashi | 369/116 X |
| 4,821,254 | 4/1989 | Satoh et al. | 369/54 |
| 4,855,842 | 8/1989 | Hayes et al. | 369/32 |
| 4,910,703 | 3/1990 | Ikeda | 364/900 X |
| 4,910,705 | 3/1990 | Boioli | 364/900 X |
| 5,005,089 | 4/1991 | Thanos et al. | 360/77.08 |
| 5,018,095 | 5/1991 | Nissimov | 364/900 |
| 5,040,159 | 8/1991 | Oliver et al. | 369/58 |
| 5,111,444 | 5/1992 | Fukushima et al. | 369/54 |

OTHER PUBLICATIONS

Morris Mano, "Computer System Architecture", 1982, pp. 50–52.
National Semiconductor Corp. pp. 3.106–3.108.

*Primary Examiner*—Nabil Z. Hindi
*Attorney, Agent, or Firm*—Fitzpatrick, Cella, Harper & Scinto

[57] ABSTRACT

According to the present invention, in a drive interface provided between a drive device for writing information in a recording medium or reading information from a recording medium and a controller device for controlling the drive device, there are provided a data signal line for transmitting data signals between the controller device and the drive device and mode signal lines for transmitting mode signals for identifying the kinds of data to be transmitted by the data signal line, and the kinds of data to be transmitted are identified by decoding the mode signals. Write operation and read operation of the drive device are also controlled by the mode signals.

11 Claims, 12 Drawing Sheets

FIG. 2

| MODE | | | DEFINITION OF DATA SIGNAL LINE |
|---|---|---|---|
| MOD2 | 1 | 0 | |
| 0 | 0 | 0 | 1. IDLE |
| 0 | 0 | 1 | 2. PROHIBITION |
| 0 | 1 | 0 | 3. PROHIBITION |
| 0 | 1 | 1 | 4. PROHIBITION |
| 1 | 0 | 0 | 5. STATUS DATA |
| 1 | 0 | 1 | 6. READ DATA |
| 1 | 1 | 0 | 7. COMMAND DATA |
| 1 | 1 | 1 | 8. WRITE DATA |

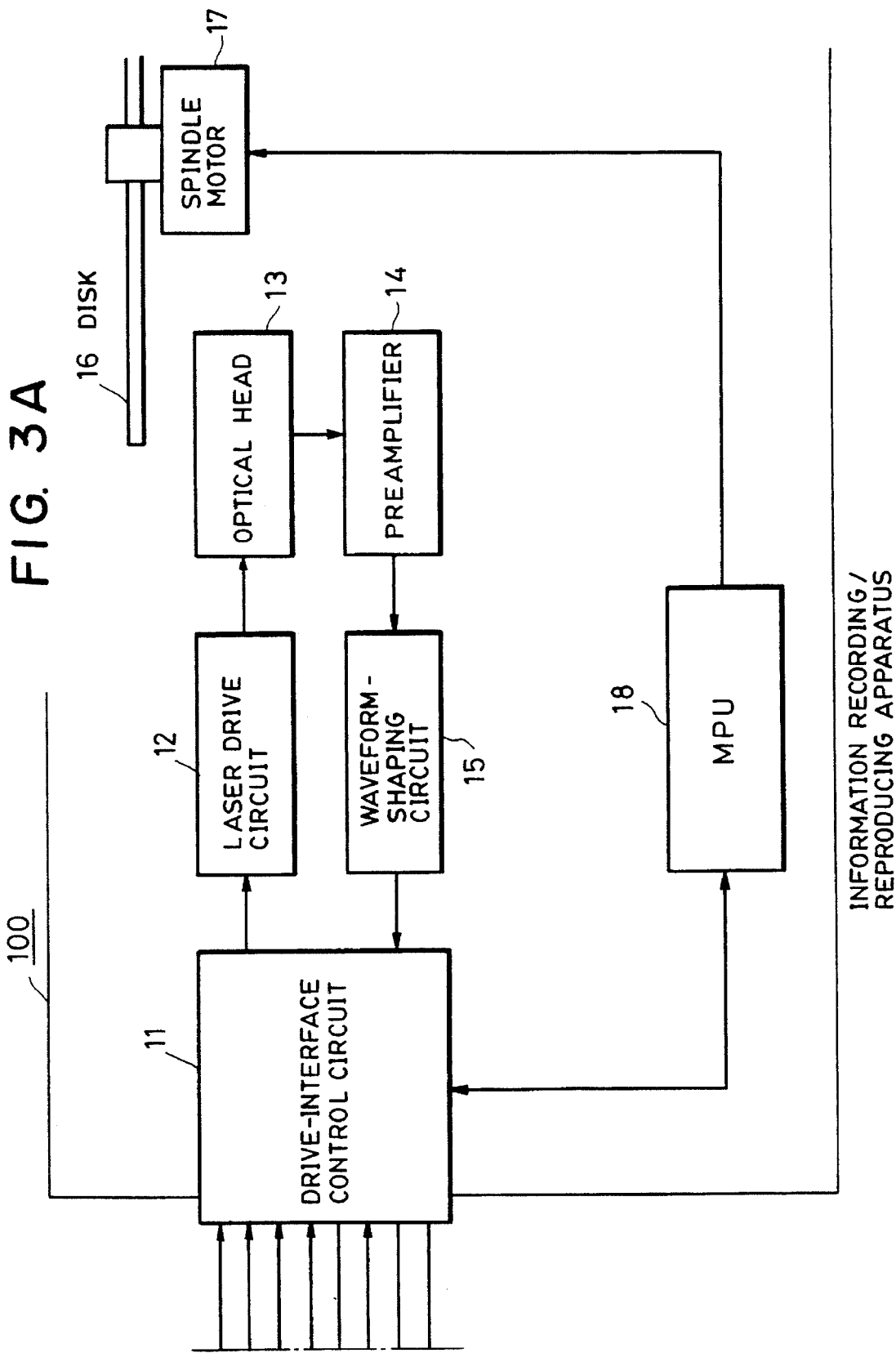

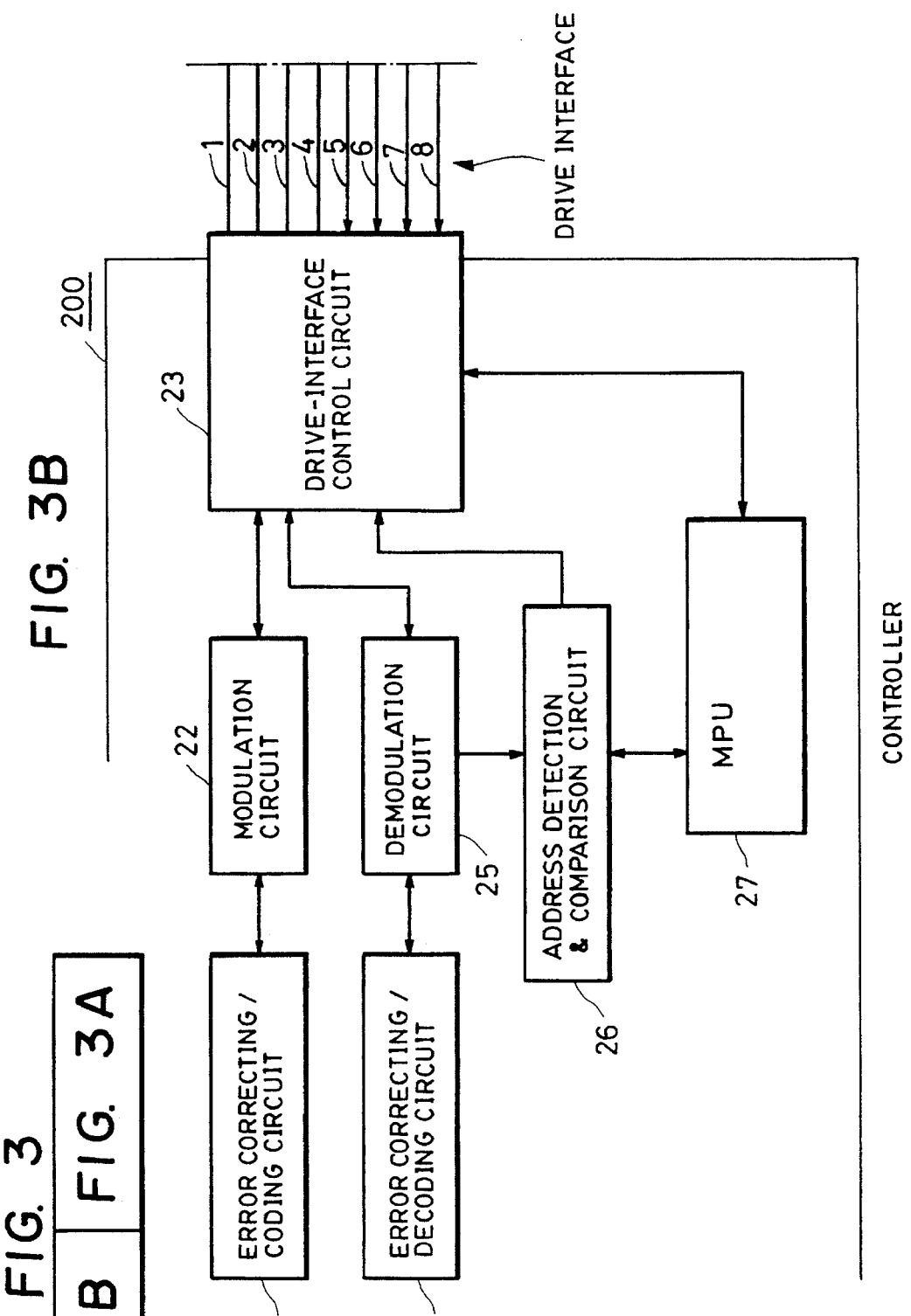

DRIVE INTERFACE FOR PERFORMING WRITE/READ OF INFORMATION

This application is a continuation of application Ser. No. 08/009,396, filed Jan. 27, 1993, abandoned which is a continuation of application Ser. No. 07/375,474, filed Jul. 5, 1989, abandoned.

BACKGROUND OF THE INVENTION

1. Field of the Invention

This invention relates to a drive interface for connecting between a drive device for performing reading or writing of information and a controller for controlling the drive device.

2. Description of Related Art

There have been provided various kinds of information processing apparatus provided with disk drive devices for performing reading or writing of data for hard disks and the like and controllers for controlling said drive devices.

In such apparatuses, an interface for connecting the drive device and the controller also has developed from ST-506 to SMD (Storage Module Drive) and ESDI (Enhanced Small Device Interface) in accordance with the tendency toward large capacity hard disks and the like.

FIGS. 10 and 11 are model drawings showing signal lines in the above-described ESDI.

In the ESDI, the following six kinds of signal lines are necessary for the disk drive and write/record data:

(1) Write Gate (the 6th pin in FIG. 11);

(2) Read Gate (the 32nd pin in FIG. 11);

(3) Write Clock (the 7th and 8th pins in FIG. 10);

(4) Read Clock (the 10th and 11th pins in FIG. 10);

(5) Write Data (the 13th and 14th pins in FIG. 10); and (6) Read Data (the 17th and 18th pins in FIG. 10).

Furthermore, for communication of command/status between the disk drive device and the controller, the following four kinds of signal lines are necessary:

(1) Transfer Ack (the 10th pin in FIG. 11);

(2) Transfer Req (the 24th pin in FIG. 11);

(3) Command Data (the 34th pin in FIG. 11); and (4) Config/Status Data (the 8th pin in FIG. 11).

Accordingly, in the drive interface of the above-described ESDI, six kinds of signal lines are necessary for data communication between the disk drive device and the controller for the communication of write/read data, and four kinds of signal lines are necessary for the communication of command/status data, That is, ten kinds of signal lines are necessary in total. Consequently, the width of a cable for the drive interface becomes large. Hence, there are problems in that it is troublesome to handle the resulting cables, and the cost of the cables increases.

An analysis of the flow of data on the drive interface indicates that always only one kind of data is transmitted at any given time in the case of transmission and reception of data (write data, read data, command data and status data) between the controller and the disk drive device.

Accordingly, there exist plural unused signal lines, and signal lines are not effectively utilized.

Furthermore, the number of devices for data communication is also large.

SUMMARY OF THE INVENTION

It is an object of the present invention to provide a drive interface in which the above-described disadvantages are removed.

It is another object of the present invention to provide a drive interface in which the number of signal lines required for data communication between a drive device and a controller can be reduced.

It is still another object of the present invention to provide a drive interface which can control operation of a drive device by means of signals indicating the kinds of data to be communicated.

These and other objects, features and advantages of the present invention will become more apparent from the following description of the preferred embodiment taken in connection with the accompanying drawings and the appended claims.

BRIEF DESCRIPTION OF THE DRAWINGS

FIG. 2 is a diagram indicating the definition of data in a data signal line;

FIG. 3, which is divided into FIGS. 3A and 3B, is a block diagram showing the configuration of a controller and a drive device;

DETAILED DESCRIPTION OF THE PREFERRED EMBODIMENT

Figure 1:
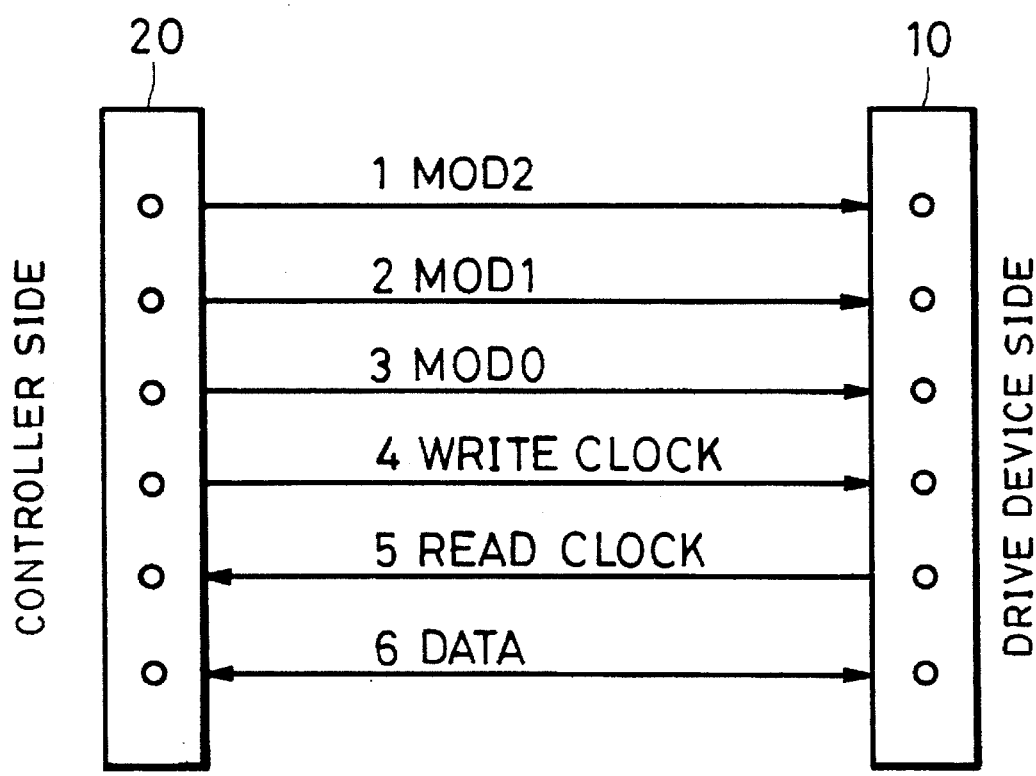
FIG. 1 is a diagram showing signal lines of a drive interface.

FIG. 1 is a plan view showing an embodiment of a drive interface according to the present invention.

The drive interface comprises six signal lines between a group 10 of input/output terminals at the side of a drive device and a group 20 of input/output terminals at the side of a controller. These signal lines of the drive interface consist of three mode signal lines 1–3, two clock signal lines 4 and 5, and one serial data signal line (i.e., channel) capable of bidirectional communication.

Each of the mode signal lines 1–3 is for transmitting a mode signal for defining data on the data signal line 6 from the controller side to the drive device side.

FIG. 2 is a model drawing indicating an example of data definition on the data signal line 6 by three mode signals.

Since there are three mode signals, eight kinds of definitions are possible by decoding these signals (i.e., using those three signals to denote a three-bit binary number identifying the mode). An example of each mode will be concretely explained with reference to FIG. 2. A case in which mode signals (MOD2, MOD1, MOD0) are (0, 0, 0) indicates an idle state in which neither writing nor reading is performed, there is no signal output to the data signal line, and data communication on the data signal line 6 is not performed. Cases in which the mode signals are (0, 0, 1), (0, 1, 0) and (0, 1, 1) indicate a prohibited state.

This is provided for the case in which new kinds of data which do not exist at present are required.

A case in which the mode signals are (1, 0, 0) indicates that data signals represent status data of the drive device, and a case in which the mode signals are (1, 0, 1) indicates that data signals represent read data from a recording medium. Furthermore, a case in which the mode signals are (1, 1, 0) indicates that the data signals are command data from the controller, and a case in which the mode signals are (1, 1, 1) indicate that the data signals are write data to be written to a recording medium.

The clock signal line 4 is for transmitting clock signals for synchronization, in transmission of data (write data and command data) from the controller to the drive device.

The clock signal line 5 is for transmitting clock signals for synchronization, in transmission of data (read data and status data) from the drive device to the controller.

As described above, in the drive interface of the present embodiment, by providing three mode signals and decoding these mode signals, it is possible to define the kinds of data on the data line 6, and thus to utilize data signal lines in common. Hence, the kinds of signal lines necessary for data communication are reduced to six, compared with ten kinds in the case of the conventional ESDI.

Next, the drive interface will be explained in relation to write/read operation.

FIG. 3 is a block diagram showing a configuration used when a drive device and a controller are connected to each other. There are shown an information write/read apparatus 100 using optical disks, as a drive device, and a controller 200 for controlling the information write/read apparatus 100. There is also shown a drive-interface control circuit 11 of the information write/read apparatus. A laser drive circuit 12 drives a laser light source according to the write data. An optical head 13 including the laser light source writes information in or reads information from an optical disk 16. A preamplifier 14 amplifies information read from the optical disk 16. A waveform-shaping circuit 15 shapes the waveform of the amplified information. A spindle motor 17 rotates the optical disk 16. A control circuit 18 controls the entire information write/read apparatus. An error correcting/coding circuit 21 adds error correcting codes to data to be written and also performs coding. There are also shown a modulation circuit 22, a drive-interface control circuit 23 of the controller, an error correcting/decoding circuit 24 for performing error correction of read data and a demodulation circuit 25. An address detection and comparison circuit 26 detects address information from read data and compares the address information with a target address. A control circuit 27 controls the entire controller. There are also shown the signal lines 1–6 shown in FIG. 1. In addition, there are provided a signal line 7 for transmitting a sector mark signal indicating the head of each sector of the disk to the controller, and a signal line 8 for transmitting an attention signal indicating an abnormal state of the drive device 100 to the controller.

Figure 4:
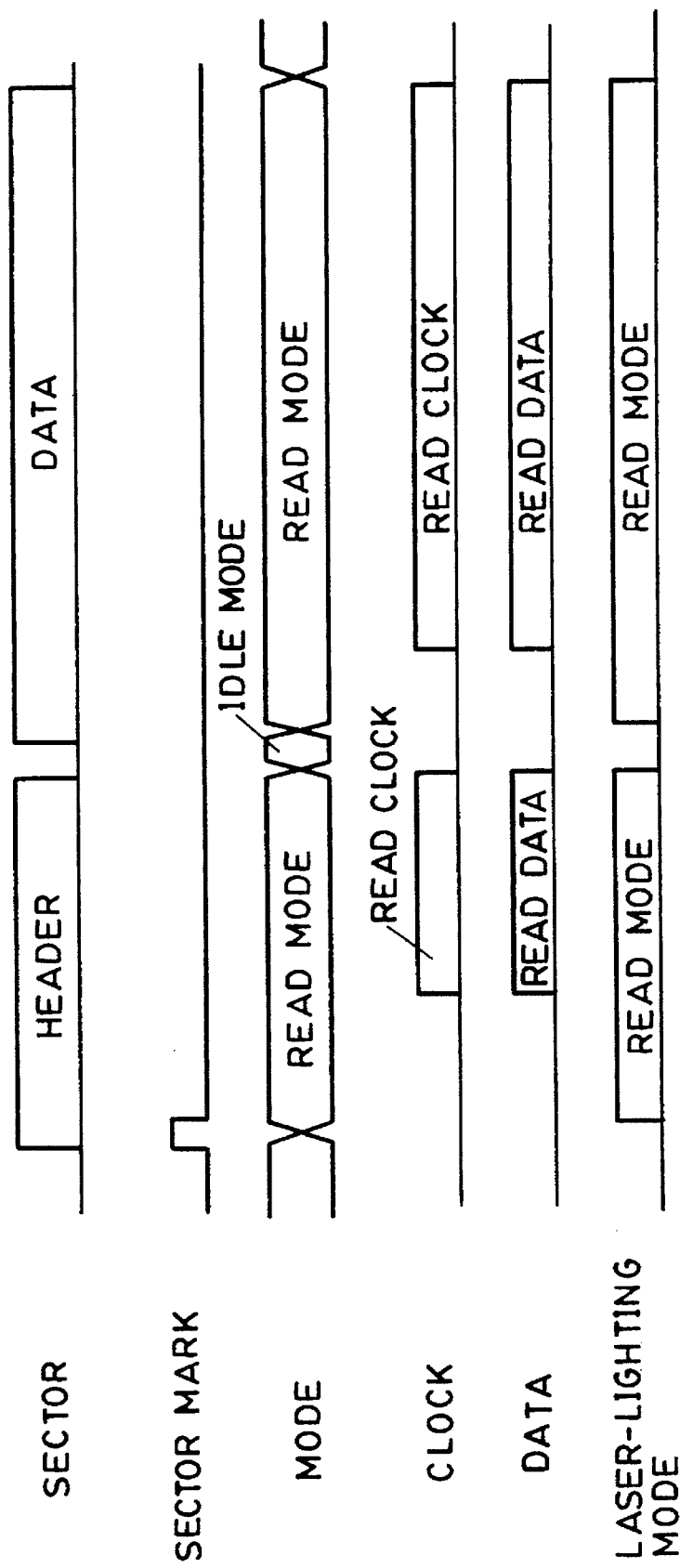
FIG. 4 illustrates time charts of signals while data are read.
Figure 5:
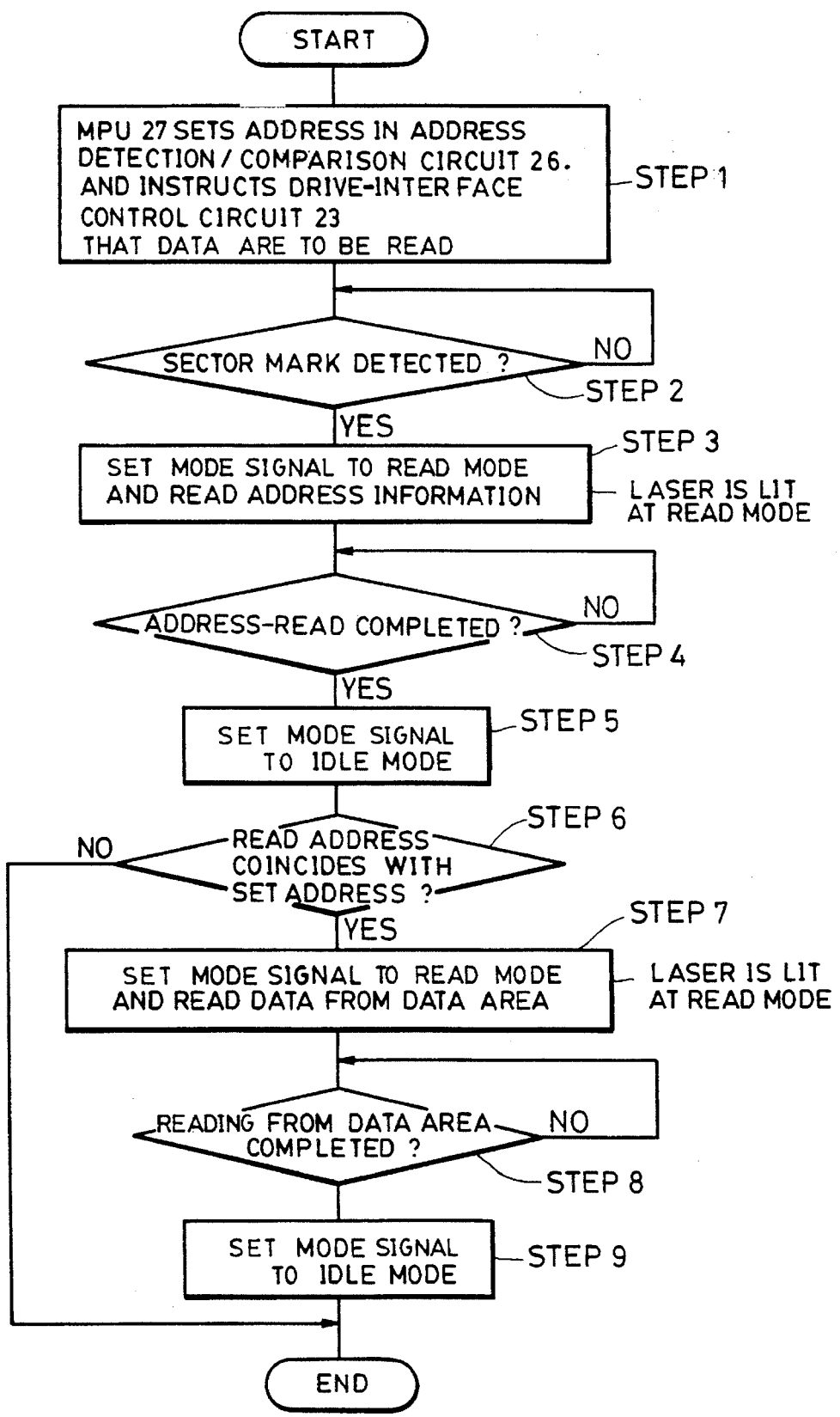
FIG. 5 is a flow chart showing a data read operation.

Next, the operation while data are read will be explained with reference to FIGS. 4 and 5. FIG. 4 illustrates time charts showing states of various signals when data in one sector are read, and FIG. 5 is a flow chart of operation while data are read.

First, the control circuit 27 of the controller sets an address of a target sector to be read in the address detection and comparison circuit 26, and instructs the drive-interface control circuit 23 that data are to be read (step 1). When a sector mark signal is received via the signal line 7, the mode signal is to indicate the read mode (1, 0, 1) and transmitted to the drive device (steps 2 and 3). At this time, the interface control circuit 11 of the drive device decodes the mode signal. When it determines that the mode signal denotes the read mode, it has the laser drive circuit 12 light the laser at the appropriate intensity for the read mode, reads address information from a header area and transmits it to the controller. When the controller determines that address information having a predetermined bit number has been read, it sets the mode signal to indicate the idle mode (0, 0, 0), transmits it to the drive device (steps 4 and 5), and determines whether or not the address information which has been read coincides with the address set in the address detection and comparison circuit 26 (step 6).

If there is a coincidence, the mode signal is set again to indicate the read mode (1, 0, 1) and is transmitted (step 7). At this time, the interface circuit 11 of the drive device decodes the mode signal as described above. If the mode signal denotes the idle mode, an idle state is provided. If the mode signal is set to indicate the read mode, the intensity of the laser is set at the level appropriate for the read mode, and data are read from a data area and transmitted to the controller. When the controller determines that reading of data of a predetermined bit number in the data area has been completed, it sets the mode signal to indicate the idle mode (0, 0, 0), and transmits it to the drive device (steps 8 and 9).

When the read address does not coincide with the set address at step 6, the above-described processing is repeated in order to read address information in the header area of the next sector.

Next, data writing operation will be explained with reference to FIGS. 6 and 7.

Figure 6:
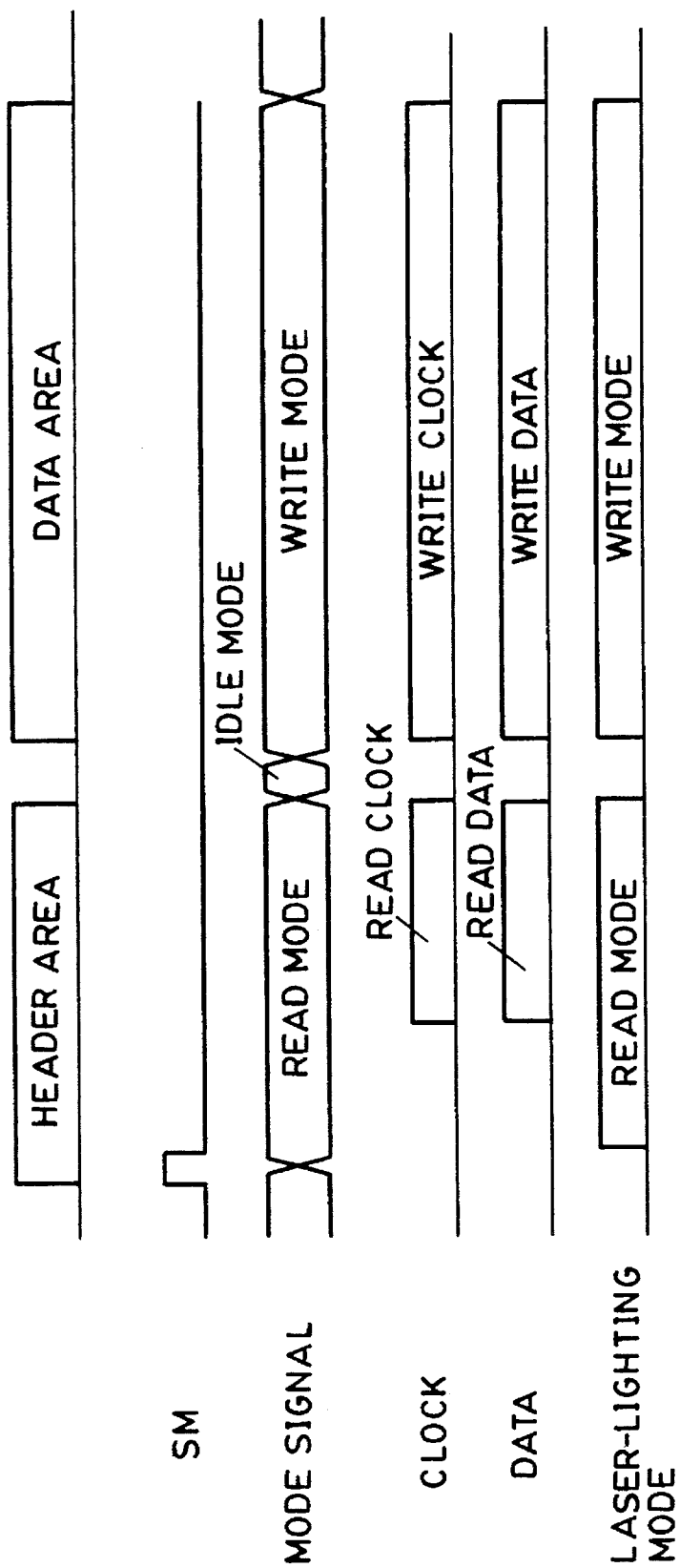
FIG. 6 illustrates time charts of signals while data are written.
Figure 7:
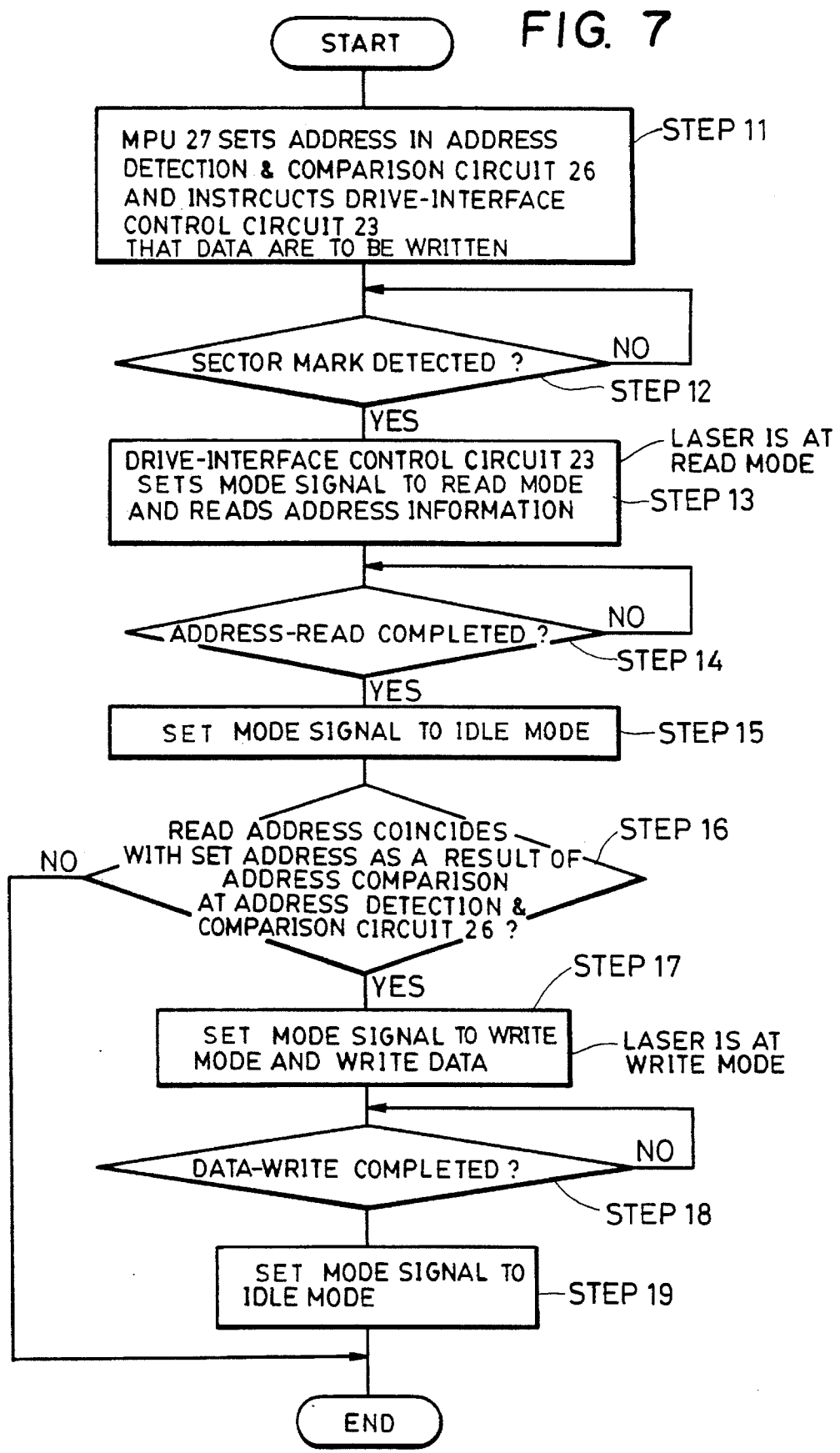
FIG. 7 is a flow chart showing a data write operation.

FIG. 6 illustrates time charts showing states of various signals when data are written in one sector, and FIG. 7 is a flow chart of operation while data are being written.

First, the control circuit 27 of the controller sets an address of a target sector in which data are to be written in the address detection and comparison circuit 26, and instructs the drive-interface control circuit 23 that data are to be written (step 11). When a sector mark signal is received via the signal line 7, the drive-interface control circuit 23 sets the mode signal to indicate the read mode (1, 0, 1) and transmits it to the drive circuit (steps 12 and 13). At this time, the interface control circuit 11 of the drive device decodes the mode signal as described above. If it determines that the mode signal denotes the read mode, it lights the laser at the intensity proper for the read mode, reads address information from the header area, and transmits it to the controller via the signal line 6. When the controller side determines that address information having a predetermined bit number has been read, it sets the mode signal to denote the idle mode (0, 0, 0), transmits it to the drive device (steps 14 and 15), and determines whether the address information which has been read coincides with the address set in the address detection and comparison circuit 26 (step 16). If there is a coincidence, the drive-interface control circuit 23 sets the mode signal to indicate the write mode (1, 1, 1) and transmits data to be written to the drive device (step 17). At this time, the interface control circuit 11 of the drive device decodes the mode signal. If it determines that the mode signal indicates the write mode, it has the laser drive circuit 12 light the laser at the intensity proper for the write mode, and writes received write data in the disk. When the drive-interface control circuit 23 determines that data having a predetermined bit number have been written, it sets the mode signal to denote the idle mode and transmits it to the drive device (steps 18 and 19). When the read address does not coincide with the set address at step 16, the above-described processing is repeated in order to read address information of the header area of the next sector.

In the above-described writing and reading operations, writing operation and reading operation of the drive device can be directly controlled according to the mode signal. That is, the received mode signal is decoded, and the interface control circuit 11 switches the light intensity of the laser to the intensity suitable for writing or reading according to the mode signal, to perform writing operation or reading operation, respectively.

Figure 8:
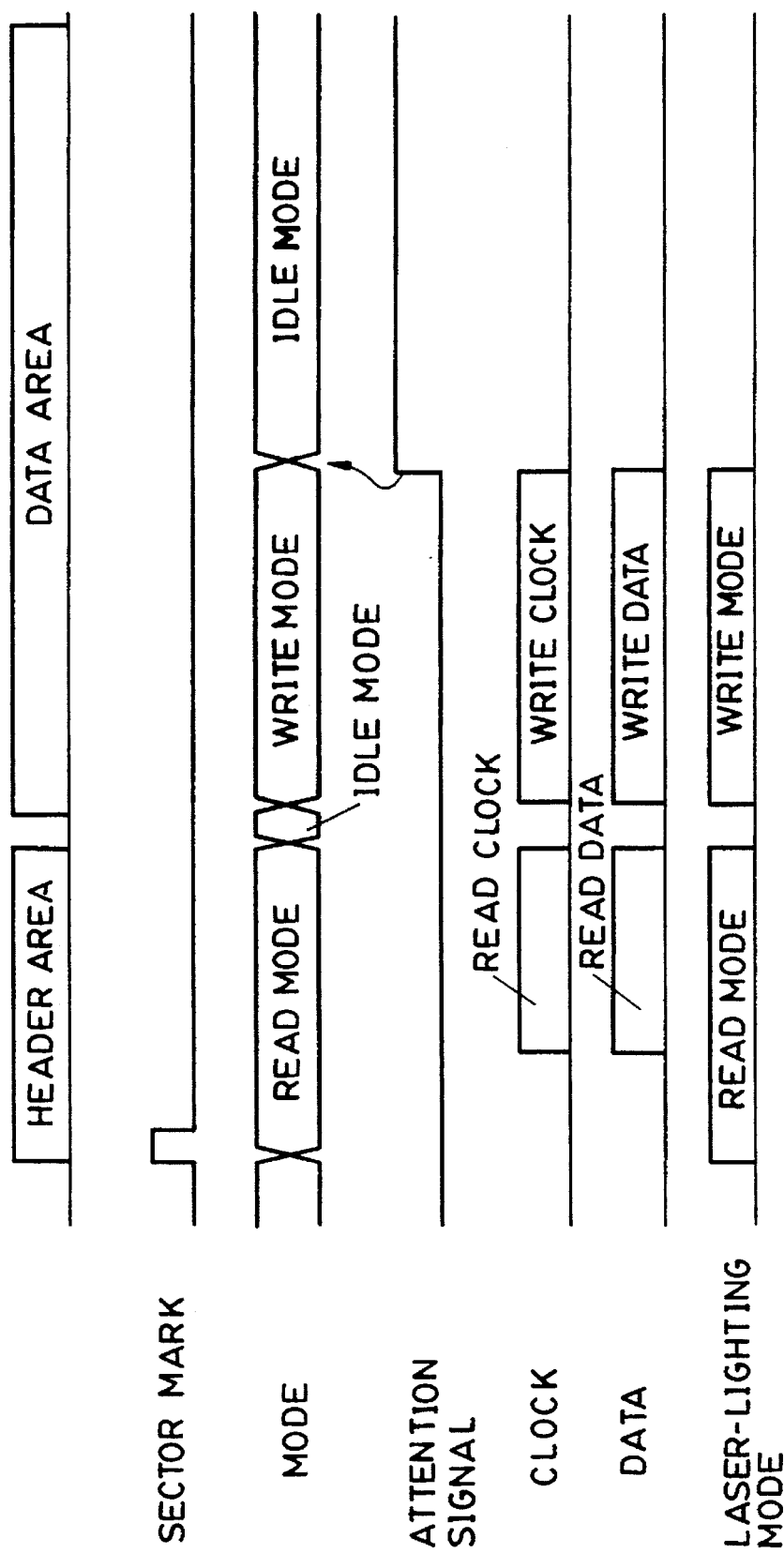
FIG. 8 illustrates time charts of signals when an abnormality occurs in a drive device.

Next, processing when an abnormality occurs will be explained with reference to FIG. 8. When, for example, some kind of abnormality occurs at the drive device side while data are being written, the drive-interface control circuit 11 transmits an attention signal to the drive-interface control circuit 23 of the controller side via the signal line 8. When the attention signal has been received, the drive-interface control circuit 23 of the controller side sets the mode signal to denote the idle mode even while the write operation is going on and transmits it to the interface control circuit 11 of the drive device side. The interface control circuit 11 decodes the mode signal. When it determines that the mode signal denotes the idle mode, it weakens the intensity of the laser and stops the write operation. It is thereby possible to prevent continuation of a useless write operation or read operation, even if an abnormality occurs at the drive device side.

Figure 9:
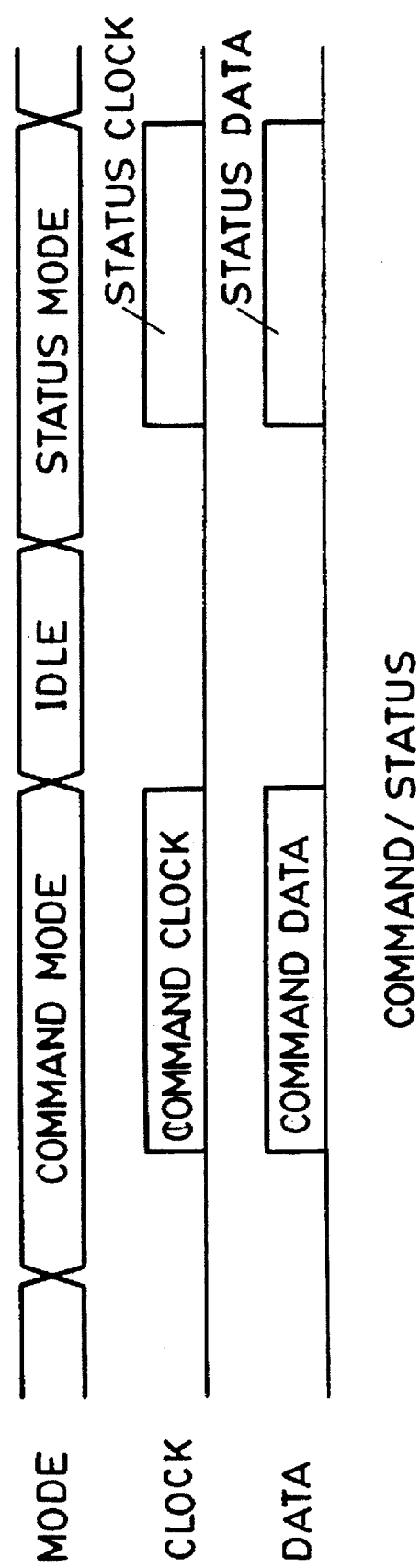
FIG. 9 illustrates time charts while transmitting command data and status data.

Next, the command mode and status mode will be explained with reference to FIG. 9.

When there is a need for the controller 200 to know the state of the drive device 100, the control circuit 27 instructs the interface control circuit 23 that command data are to be transmitted. The interface control circuit 23 sets the mode signal to denote the command mode, transmits it to the drive circuit and also transmits command data output from the control circuit 27 to the drive circuit via signal line 6. When command data having a predetermined bit number have been transmitted, the mode signal is set to indicate the idle mode and transmitted for a predetermined time, and subsequently the mode signal is set to denote the status mode and transmitted. When the command data have been received, the drive circuit side investigates the state of the drive device in accordance with the content of the command data. If the drive circuit side detects that the mode signal denotes the status mode, it transmits status data to the controller side via signal line 6.

It is to be noted that, in FIG. 1, when data are transmitted from the controller side to the drive device side on signal line 6, clock signals are transmitted from the controller side to the drive device side via signal line 4. On the other hand, when data are transmitted from the drive device side to the controller side, clock signals are transmitted from the drive device side to the controller side via signal line 5.

As described above, by transmitting signals using a data signal line for transmitting data signals between a drive device and a controller, and mode signal lines for transmitting mode signals for identifying tile kinds of data to be transmitted through the above-described data signal line, it is possible to reduce the number of signal lines needed for data communication between the drive device and the controller. Hence, the present invention makes it possible to improve ease in handling cables in a drive interface, and also makes it possible to reduce the cost of the cables.

The present invention is not limited to the above-described embodiment, but various modifications may also be made within the spirit and scope of the following claims.

What is claimed is:

1. A drive interface provided between a drive device for writing information on a recording medium or reading information from the recording medium and a controller device for controlling the drive device, said drive interface comprising:

a single bidirectional data signal channel for transmitting a plurality of kinds of data signals bidirectionally between the controller device and the drive device; and mode signal lines, distinct from said data signal channel, for transmitting mode signals from the controller device to the drive device for identifying kinds of data transmitted by said data signal channel.

2. A drive interface according to claim 1, wherein said data signal line transmits at least two of the write data to be written on the recording medium, read data read from the recording medium, command data for the drive device and status data representing a status of the drive device.

3. A drive interface according to claim 1, wherein said mode signal lines transmit at least two of:

a first mode signal indicating transmission of read data read from the recording medium;

a second mode signal indicating transmission of write data to be written on the recording medium;

a third mode signal indicating transmission of command data for the drive device;

a fourth mode signal indicating transmission of status data representing a status of the drive device; and a fifth mode signal indicating an idle state in which data is not being transmitted.

4. A drive interface according to claim 3, further comprising means for interrupting a write or read operation by sending said fifth mode signal in response to occurrence of an abnormality in the drive device while the controller device is executing the data write or read operation for the drive device.

5. A drive device, connectable to a controller device for controlling said device, for writing information on a recording medium or reading information from the recording medium, said drive device comprising:

a single bidirectional data signal channel for transmitting a plurality of kinds of data signals bidirectionally between the controller device and said drive device;

mode signal lines, distinct from said data signal channel, for receiving mode signals from the controller device for identifying the kinds of data transmitted by said data signal channel from the controller device; and control means for controlling write operation or read operation of said drive device on the basis of the data signals received by said data signal channel and the mode signals received by said mode signal lines.

6. A drive interface according to claim 5, wherein said data signal line transmits at least two of the write data to be written on the recording medium, read data read from the recording medium, command data for said drive device and status data representing status of said drive device.

7. A drive interface according to claim 5, wherein said mode signal lines transmit at least two of:

a first mode signal indicating transmission of read data read from the recording medium;

a second mode signal indicating transmission of write data to be written on the recording medium;

a third mode signal indicating transmission of command data for said drive device;

a fourth mode signal indicating transmission of status data representing a status of said drive device; and a fifth mode signal indicating an idle state in which data is not being transmitted.

8. A drive interface according to claim 5, wherein the recording medium has a header area in which address information on the medium is written and a data area in which non-address information is to be written, and wherein said control means causes address information to be read from the header area, and causes information to be written in the data area or causes information to be read from the data area, according to the mode signals.

9. A drive interface according to claim 5, wherein the drive device includes means for writing or reading information by irradiating light on the recording medium, and wherein said control means controls the intensity of the light irradiated on the recording medium according to the mode signals.

10. A drive device, connectable to a controller device for controlling said drive device, for writing information on a recording medium or reading information from the recording medium, said drive device comprising:

a single bidirectional data signal channel for transmitting a plurality of kinds of data signals bidirectionally between the controller device and said drive device;

mode signal lines, distinct from said data signal channel, for receiving mode signals from the controller device for identifying the kinds of data transmitted by said data signal channel; and means for identifying the kinds of data transmitted by said data signal channel, by decoding the mode signals received on said mode signal lines.

11. A drive device according to claim 10, wherein said data signal line transmits at least two of the write data to be written on the recording medium, command data for said drive device and status data representing a status of said drive device.

* * * * *

UNITED STATES PATENT AND TRADEMARK OFFICE
CERTIFICATE OF CORRECTION

PATENT NO. : 5,497,362

DATED : March 5, 1996

INVENTOR(S) : TAKAYUKI AIZAWA

It is certified that error appears in the above-identified patent and that said Letters Patent is hereby corrected as shown below:

SHEET 11

Figure 10:
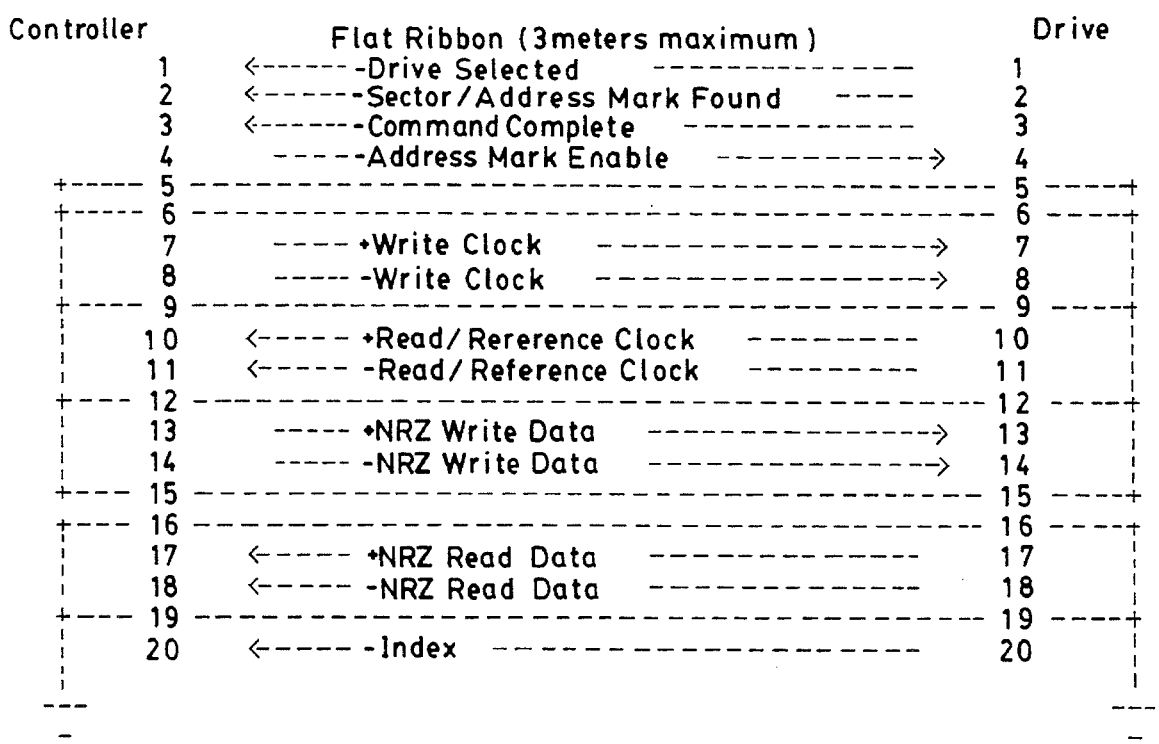
FIGS. 10 and 11 are diagrams showing signal lines in a conventional ESDI.
Figure 11:
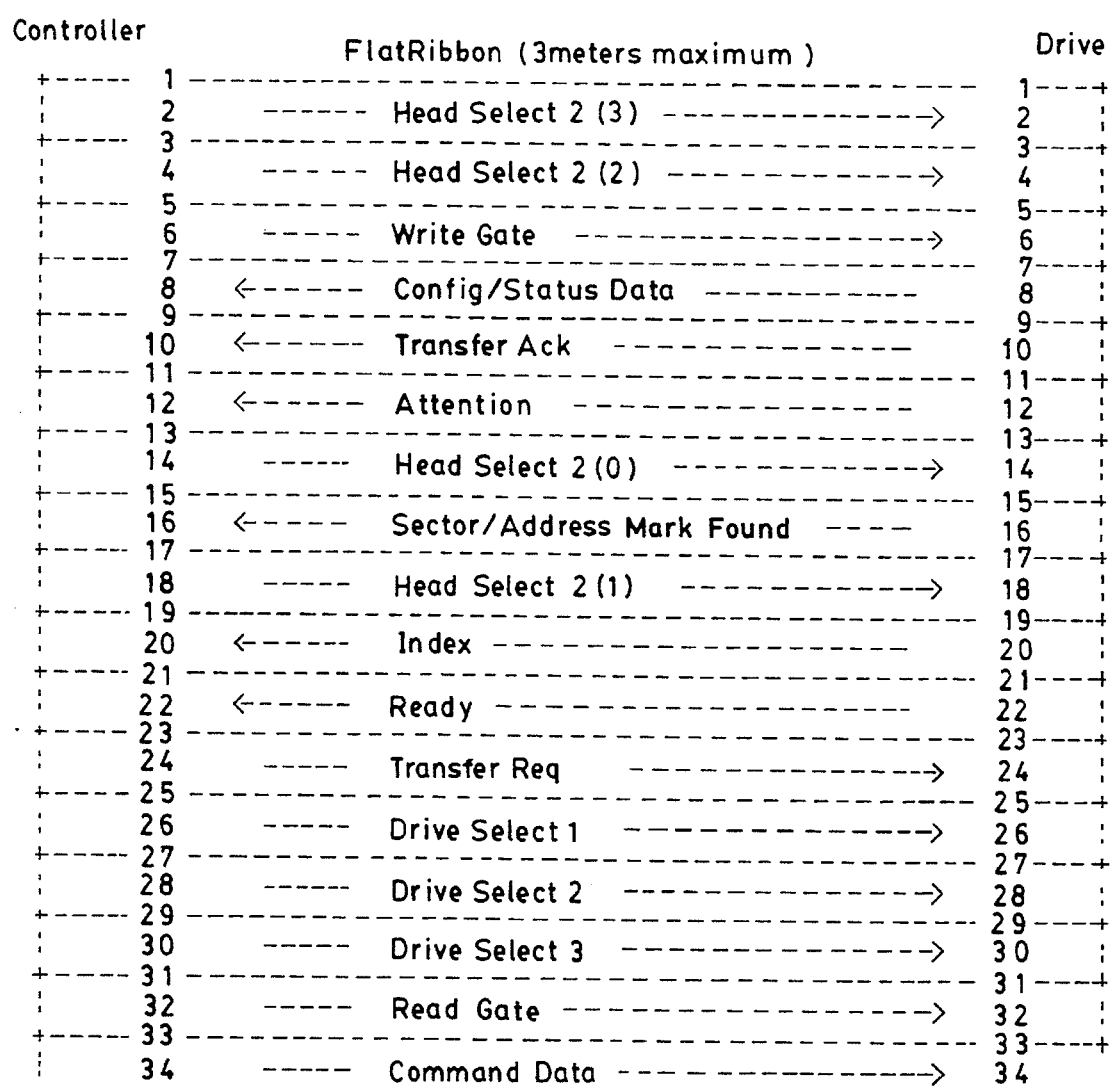

Figure 10, "+Read/Rererence" should read
--+Read/Reference--.

COLUMN 5

Line 63, "tile" should read --the--.

COLUMN 6

Line 58, "interface" should read --device--.
Line 63, "interface" should read --device--.

COLUMN 7

Line 9, "interface" should read --device--.
Line 17, "interface" should read --device--.

Signed and Sealed this

Sixteenth Day of July, 1996

Attest:

BRUCE LEHMAN

*Attesting Officer*  *Commissioner of Patents and Trademarks*